June 17, 1952 M. N. YARDENY 2,601,133
RECHARGEABLE BATTERY
Filed Dec. 6, 1949
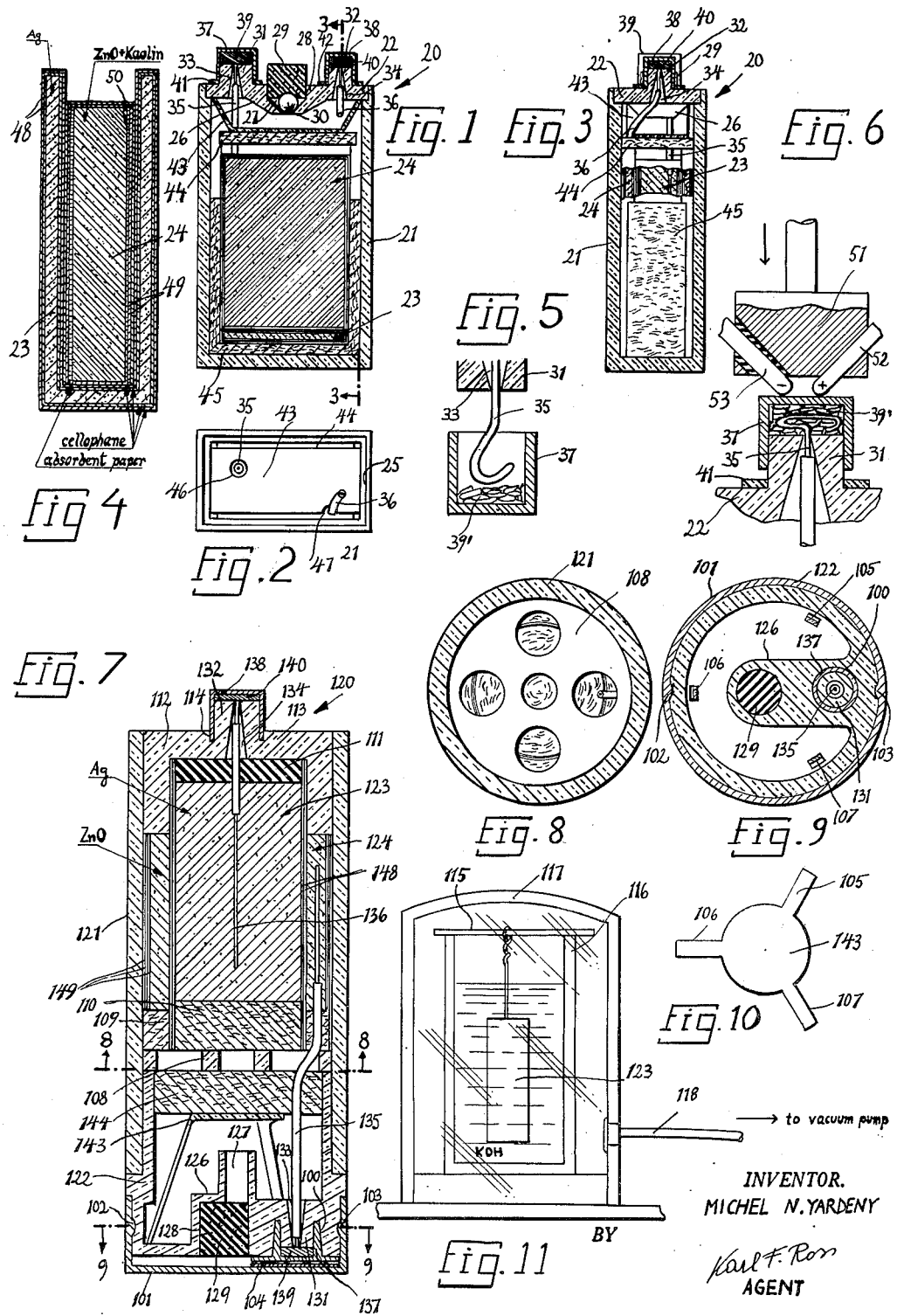
INVENTOR.
MICHEL N. YARDENY
BY
Karl F. Ross
AGENT Patented June 17, 1952

2,601,133

UNITED STATES PATENT OFFICE 2,601,133

RECHARGEABLE BATTERY

Michel N. Yardeny, New York, N. Y., now by judicial change of name Michel N. Yardney, assignor to Yardney International Corp., New York, N. Y., a corporation of New York Application December 6, 1949, Serial No. 131,320

4 Claims. (Cl. 136—6)

The present invention relates to rechargeable batteries of the silver and zinc type in which the electrodes, consisting of silver and zinc and/or their oxides (depending upon the state of charge) preferably in powder form, are held under considerable pressure in a receptacle or casing containing little if any free electrolyte; batteries of this general description have been disclosed, for example, in co-pending application Ser. No. 66,291, filed December 20, 1948, now Patent Number 2,594,710 issued April 29, 1952, by H. André.

An object of the present invention is to provide a more compact battery of the general character set forth above which may be built on a mass production basis and is of rugged construction while still being of minimum weight and dimensions for a given storage capacity.

Another object of this invention is to provide, in a battery of the character described, means for enabling the escape of gases without permitting the escape of electrolyte.

A further object of the instant invention is to provide, in a battery as set forth above, means forming a low-ohmic, shockproof electrical connection between the electrodes and the external terminals, as well as a method of making such a connection.

Still another object of the invention is to provide novel methods of conditioning the electrodes preparatory to their assembly in a battery of the type referred to.

The above and other objects of the invention will become apparent from the following description, reference being had to the accompanying drawing in which:

Fig. 1 is a central sectional elevation of a battery made in accordance with the principles of the present invention;

Fig. 2 is a top plan view of the battery of Fig. 1, with the cover of the casing removed;

Fig. 3 is a side elevation taken on the line 3—3 of Fig. 1;

Fig. 4 is a side elevation of the electrodes forming part of the battery of Figs. 1-3, shown in section in the position they occupy when assembled in the battery;

Fig. 5 is a detail view illustrating a step in the formation of a terminal connection according to the invention;

Fig. 6 is another detail view showing a subsequent step in the formation of the terminal connection;

Fig. 7 is a sectional elevation through the axis of a modified form of battery, of circular configuration, according to the present invention;

Fig. 8 is a section on the line 8—8 of Fig. 7;

Fig. 9 is a section on the line 9—9 of Fig. 7;

Fig. 10 is a top plan view of a baffle member forming part of the battery of Figs. 7-9; and Fig. 11 diagrammatically illustrates a method of conditioning the center electrode of the battery shown in Figs. 7-9.

Referring to Figs. 1-3, there is shown a battery generally designated 20, comprising a casing 21, a cover or lid 22 for this casing, and a set of electrodes including a positive electrode, generally indicated at 23, and a negative electrode, generally indicated at 24. The positive electrode preferably consists, essentially, of powdered silver which is at least partially converted into silver peroxide $Ag_2O_2$ when the battery is charged; the negative electrode preferably consists, essentially, of powdered zinc which is at least partially converted into zinc oxide $ZnO$ when the battery is discharged.

The cover 22 is seated in a recess 25 of the casing 21 and is formed at its center with a depending boss 26 having a conical, downwardly tapering bore 27 which opens at the top into a larger, cylindrical bore 28. A plug 29 of sponge rubber or similar porous, resilient material fits snugly inside the bore 28 and yieldably bears upon a ball 30 which seats in the bore 27, thereby forming a check valve which allows for the escape of gases developed in the interior of the casing 21 while barring the entrance of air into the casing. The casing 21 and its lid 22 consist of a suitable plastic material, preferably polystyrene.

The lid 22 is further provided, on opposite sides of the aperture 28, with upstanding cylindrical projections 31, 32 each provided with a conical, upwardly tapering bore 33, 34 through which passes a respective lead wire 35, 36. The wires 35, 36, whose lower extremities are embedded in the electrodes 24, 23, respectively, are coated with a suitable insulant such as rubber and this coating extends partly into the electrode, as clearly seen in Fig. 3 for the wire 35. The tops of the wires are conductively connected to preferably silver plated metal caps 37, 38, which respectively embrace the projections 31 and 32, by means of blobs of solder 39, 40 which also serve to hold the caps in place. Washers 41, 42, preferably distinctly colored to identify the negative and the positive terminal, surround the projections 31, 32 and are held in place by the caps 37, 38, respectively. The projections 31, 32 and their associated caps also differ in size, as shown, for more convenient identification.

A baffle member 43, of trapezoidal cross section as clearly seen in Fig. 1, overlies the electrode assembly 23, 24 and is spaced therefrom by a layer 44 of absorbent material, e. g. felt. A layer of similar material, indicated at 45, is placed in the form of a U-shaped strip around the bottom of the electrode assembly. From Figs. 1 and 2 it will be noted that the strip 44 does not extend completely across the width of the casing 21, while Figs. 2 and 3 show that the extent of both the baffle 43 and the strip 45 in the direction of depth, or smallest dimension, of the battery 20 is somewhat less than the spacing of the walls of the casing 21 in that direction. This arrangement enables substantially unhindered passage of gases toward the valve 26—30 while the provision of the baffle 43 prevents any spray of free electrolyte, such as may occur during the charging process, from reaching the valve and being entrained into the atmosphere by the escaping gases.

As best seen in Fig. 2, the baffle 43 is provided with a hole 46 and with a notch 47 to accommodate the leads 35, 36, respectively. These cutouts are sufficiently wide to allow for the free displacement of the baffle, within the limits set by its spacing from the walls of the casing, so that any rush of free electrolyte toward the lid 22 will be prevented since, when the battery is turned upon one of its large faces, the baffle 43 will immediately slide toward whichever wall of the casing occupies the bottom position. It should also be noted that the provision of felt layers 44, 45, serving as means to absorb and store the electrolyte, limits the quantity of free liquid inside the casing to such a value that its level will not, in an inverted position of the battery, surpass the top of the boss 26; hence the peculiar formation of the cover 22 forms a trap which, conjointly with the baffle 43, effectively prevents any electrolyte from leaving the battery.

The positive electrode 23, consisting of tightly packed silver (in the discharged condition of the battery) enclosed by cellophane wrappings 48, is of U-shaped configuration and surrounds the negative electrode 24, see particularly Fig. 4. Electrode 24 consists of tightly packed zinc oxide, to which a suitable binder has been added, held within cellophane wrappings 49; a strip 50 of absorbent paper, such as known, for example, under the name Aldex, may be interposed between the electrode proper and the wrappings 49. Colloidal kaolin may be used as the binder with excellent results; this material may be admixed with the zinc oxide in a proportion of 5% or less, by weight, a mixture of 25 parts of kaolin and 1000 parts of zinc oxide having been found highly satisfactory. The mixture, which has the consistency of a paste when moistened with electrolyte, is then wrapped in the absorbent paper 50 whereupon the cellophane wrappings 49 and, finally, the positive electrode 23 with its wrappings 48 are placed around it in the manner illustrated. The assembly is now ready to be introduced into the casing 21 where, after the addition of a predetermined amount of electrolyte such as KOH, the cellophane tends to swell beyond the limits allowed by the rigid walls of the casing 21; this places the electrodes under pressure, resulting in a favorable electro-chemical reaction as more fully described in various applications filed by H. André including the one identified above.

The height of the silver electrode 23 materially exceeds that of the negative electrode 24, as clearly seen in Figs. 1, 3 and 4. This expedient has been found effective to prevent internal short circuits between the electrodes.

Figs. 5 and 6 illustrate how the lead wires, metal caps and washers are advantageously assembled to form a rigid unit with the projections 31, 32 of the lid 22. As shown in Fig. 5, the metal cap (e. g. the cap 37) is first inverted and filled with a predetermined amount of solder in the form of small fragments 39'. The inverted lid 22, with a suitable length of wire 35 extending from its corresponding projection 31, is then brought down so that the cap 37 embraces the projection 31, causing the wire to buckle and trapping the solder pieces 39' in the intervening space. The lid may now be righted, as shown in Fig. 6, whereupon the cap 37, solder 39' and wire 35 are heated to melt the solder while the simultaneous exertion of pressure upon the cap forces the latter down upon the washer 41, thus giving the assembly shown in Figs. 1 and 3. The simultaneous application of heat and pressure may be accomplished by bringing a piston head 51, provided with a grounded positive electrode 52 and a suitably insulated negative electrode 53, down upon the cap 37 as illustrated in Fig. 6. The solder 39', transformed into the homogeneous mass 39, thus conductively and mechanically joins the wire 35 to the cap 37 which, by being thus held in place, also prevents the detachment of washer 41.

In the modification of Figs. 7–10, there is shown a battery 120 comprising a cylindrical housing 121, a trap member 122 extending from below into this housing, a positive electrode 123 concentric therewith and a negative electrode 124 surrounding the positive electrode. The trap member 122 is formed with a boss 126, rising from the bottom thereof, which has a concentric bore 127 opening into a larger, eccentric bore 128, the latter containing the sponge rubber plug 129. Boss 126 extends radially toward the periphery of member 122 and is provided with a circular channel 100 surrounding a projection 131 which latter, however, terminates short of the bottom of the trap member. The projection 131 is formed with a conical center bore 133 through which passes the negative lead 135 terminating in the electrode 124. Lead wire 135 is galvanically and mechanically united, by means of solder 139, with a flanged metal cap 137 which extends into the channel 100. A resilient closure cap 101, having teats 102, 103 which fit into corresponding recesses in the trap member 122, firmly engages the latter and makes conductive contact with the cap 137 and, thereby, with the wire 135 through the intermediary of a spring washer 104.

Resting on the bottom of trap member 122 is a baffle member 143 having a similar function to the member 43 of Figs. 1–3. Baffle 143, as best seen in Fig. 10, is in the form of a disk from which three legs 105, 106, 107 extend downwardly with a spacing of 120°. The disk portion of member 143 concentrically overlies the central aperture 127 of the boss 126 which again does not permit any electrolyte from passing outwardly through the exit 128. Baffle 143 is freely movable inside the casing 121 in similar manner to baffle 43 in casing 21.

A felt disk 144, topped by an apertured spacer 108, overlies the baffle 143. Spacer 108 supports the electrode assembly which includes a felt ring 109, co-extensive in radial direction with the annular electrode 124 and its wrapping 149, and another felt disk 110 which is co-extensive with the concentric electrode 123 and positioned inside the wrapping 148 thereof. It will be noted that the two electrodes 123, 124 are axially staggered and that the positive electrode again rises above the negative. A rubber washer 111, also surrounded by the cellophane wrapping 148, rests atop the positive electrode 123.

An insert 112, recessed to receive the upper portion of the assembly 123, 148, 111, is formed with a central projection 132 having a conical bore 134. The positive lead 136, rising from the electrode 123, passes through a bore 113 of washer 111 and through the bore 134 and is galvanically and mechanically secured to a metal cap 138 by means of solder 140. It will be seen that the cap 138 extends into an annular channel 114 provided in the insert 112.

It will be understood that the function of the various elements of the battery 120 is analogous to that of corresponding elements of battery 20 which will be readily identifiable since the same numerals, supplemented in Figs. 7–10 by a hundreds digit, have been used throughout.

Fig. 11 illustrates a method of preparing the concentric electrode 123 for insertion into the casing 121. The electrode is suspended by its lead wire from a bar 115 placed on the rim of a vessel 116 containing the electrolyte, the electrode being completely submerged in the liquid. The vessel 116 is enclosed within a container 117 which, via a conduit 118 leading to a vacuum pump (not shown), is maintained in evacuated condition until the interstices of the electrode, consisting of silver particles which may have been compressed under a pressure of the order of several tons per square inch, have given off all the air they contained and have, instead, been permeated with electrolyte, this condition becoming apparent by the cessation of the rise of bubbles from the liquid. The electrode is then ready to be wrapped in cellophane 148 and to take its place in the casing 121.

It should be understood that the invention is not limited to the precise embodiments shown and described, being on the contrary capable of numerous modifications and adaptations without exceeding its scope as defined in the objects and in the appended claims.

What is claimed is:

1. In an electric battery, in combination, a casing having a raised internal portion and a vent in said raised portion, an electrode assembly in said casing, an electrolyte permeating said electrode assembly, a layer of absorbent material extending completely across said casing between said vent and said electrode assembly in at least one dimension of the casing, means including said layer limiting the amount of free electrolyte in said casing to a quantity insufficient to surpass said raised portion, and thereby to reach said vent, in any position of said casing, and a baffle member loosely positioned between said layer and said vent, said baffle member having a solid portion in line with said vent, said solid portion extending over less than the entire cross section of said casing but overlying substantially all clearance left between said layer and said casing, thereby providing a circuitous passage for gases released from said electrolyte and escaping through said vent.

2. The combination according to claim 1, further including a ball seated in said vent and resilient means urging said ball into a position of closure of said vent.

3. The combination according to claim 1, further including a ball seated in said vent and a plug of sponge rubber in said vent overlying said ball and resiliently urging same into a position of closure of said vent.

4. In an electric battery, in combination, a casing having a raised internal portion and a vent in said raised portion, an electrode assembly in said casing, an electrolyte permeating said electrode assembly, a layer of absorbent material between said vent and said electrode assembly, said electrode assembly and said layer extending across the full width of the casing in one dimension and across less than the full width of the casing in another dimension, means including said layer limiting the amount of free electrolyte in said casing to a quantity insufficient to surpass said raised portion, and thereby to reach said vent, in any position of said casing, and a baffle member loosely positioned between said layer and said vent, said baffle member having a solid portion in line with said vent, said solid portion extending over less than the full width of the casing in said one dimension but overlying substantially all clearance left between said layer and said casing by extending across the full width of the casing in said other dimension, thereby providing a circuitous passage for gases released from said electrolyte and escaping through said vent.

MICHEL N. YARDENY.

REFERENCES CITED

The following references are of record in the file of this patent:

UNITED STATES PATENTS

| Number | Name | Date |
|---|---|---|
| 455,986 | Hayes et al. | July 14, 1891 |
| 535,090 | Brewer | Mar. 5, 1895 |
| 940,043 | Morrison | Nov. 16, 1909 |
| 1,605,820 | Edwards | Nov. 2, 1926 |
| 1,950,156 | Swoboda | Mar. 6, 1934 |
| 1,998,788 | Pautou | Apr. 23, 1935 |
| 2,049,838 | Haussauer | Aug. 4, 1936 |
| 2,082,606 | Woodbridge | June 1, 1937 |
| 2,092,214 | Janko | Sept. 7, 1937 |
| 2,141,621 | Setzer | Dec. 27, 1938 |
| 2,176,173 | Fuller et al. | Oct. 17, 1939 |
| 2,206,122 | Rasch | July 2, 1940 |
| 2,270,166 | Hiensch et al. | Jan. 13, 1942 |
| 2,317,711 | Andre | Apr. 27, 1943 |

FOREIGN PATENTS

| Number | Country | Date |
|---|---|---|
| 597,057 | France | Nov. 12, 1925 |
| 613,344 | Great Britain | Nov. 25, 1948 |